3,644,389
6-HYDROXY-1,3-DIALKYL BENZOTRIAZOLIUM DERIVATIVES

Robert Frédéric Michel Sureau, Enghien-les-Bains, Marie-Josephe Jeanne Alicot, Montmorency, and Victor Marie Dupré, Louvres, France, assignors to Ugine Kuhlmann, Paris, France
No Drawing. Filed May 26, 1969, Ser. No. 827,964
Claims priority, application France, Dec. 9, 1965, 41,598
Int. Cl. C07d 55/04; C07f 3/06; C09b 29/36
U.S. Cl. 260—299                                    4 Claims

ABSTRACT OF THE DISCLOSURE

The present invention relates to new 6-hydroxy-1,3-dialkylbenzotriazolium salts of the following formula:

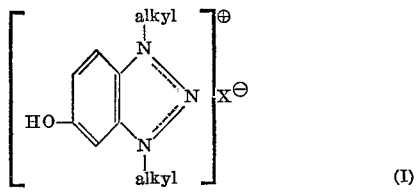

wherein $X^{\ominus}$ represents a monovalent anion and the alkyl groups in positions 1 and 3 are the same or different.

CROSS REFERENCE TO OTHER APPLICATIONS

This application is a continuation-in-part of copending application Ser. No. 598,920 filed Dec. 5, 1966 and now abandoned.

The present invention relates to new 6-hydroxy-1,3-dialkylbenzotriazolium salts of the following formula:

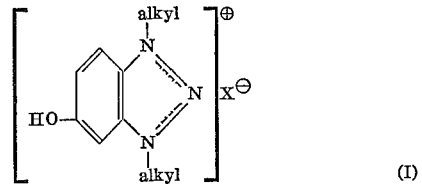

in which $X^{\ominus}$ represents a monovalent anion.

In the above formula the alkyl groups in positions 1 and 3 may be the same or different, and are preferably methyl or ethyl groups. The monovalent anion may be, for example, a halide or $SO_4CH_3^{\ominus}$ or $SO_4C_2H_5^{\ominus}$ groups.

The salts of the Formula I may be prepared, for example, by hydrolysis of the corresponding 6-amino-1,3-dialkylbenzotriazolium salts in dilute sulphuric acid solution at a temperature between 175° C. and 220° C. These amino derivatives are described in French Pat. No. 1,364,560.

The 6-hydroxy-1,3-dialkylbenzotriazolium salts of this invention are crystalline compounds which are generally very soluble in water. They are useful as coupling components for the preparation of the azo dyestuffs of the following formula:

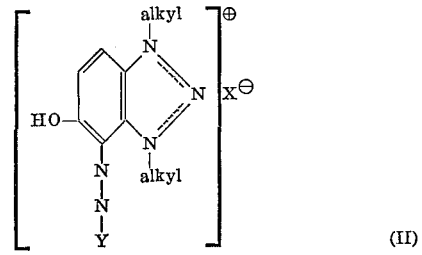

in which X represents a monovalent anion, Y represents the residue of a diazotisable aromatic or heterocyclic primary amine containing no carboxylic or sulphonic groups.

The dyestuffs of Formula II may be prepared in a convenient and quite general way by coupling the diazo derivative of an amine of the formula Y—$HN_2$ where Y has the meaning given above with a 6-hydroxy-1,3-dialkylbenzotriazolium salt of Formula I in aqueous, preferably neutral or alkaline solution. These dyestuffs possess all the properties of the quaternary deystuffs and have in particular a great affinity for fibres based on polymers or copolymers of acrylonitrile. The shades obtained are very uniform and cover the whole range from yellow to reddish orange. They have in general good brilliance and excellent general fastness.

In the following examples, which are purely illustrative, the parts are by weight unless the contrary is indicated.

EXAMPLE 1

A solution of 25 parts of 6-amino-1,3-dimethylbenzotriazolium chloride, described in Example 1 of the above mentioned French patent, in 110 parts of water and 11 parts by volume of 66° Bé. sulphuric acid is heated at 180° C. for 6 hours. 35 parts of sodium chloride are added to the solution which has been cooled to —5° C. A white crystalline precipitate of 6-hydroxy-1,3-dimethylbenzotriazolium chloride is precipitated and is filtered off, washed with a saturated sodium chloride solution, drained and dried at 100° C. Dry weight obtained: 16.8 parts titrating 78%.

For analysis, it is recrystallised twice from absolute ethanol. M.P. on a Maquenne block 264° C. (with decomposition).

Analysis.—Calculated for $C_8H_{10}ON_3Cl$ (percent): C, 48.2; H, 5.02; N, 21.05; Cl, 17.8. Found (percent): C, 48.7, 48.2; H, 5.28, 5.08; N, 20.7, 20.6; Cl, 18.4, 17.7.

EXAMPLE 2

On addition of sodium iodide to the filtrate of Example 1 a precipitate is obtained which is composed chiefly of 6-hydroxy-1,3-dimethylbenzotriazolium iodide. Dry weight obtained: 10 parts.

EXAMPLE 3

82 parts of 6-nitrobenzotriazole are introduced in the space of one hour into 154 parts of diethyl sulphate at 110–120° C. The temperature is maintained at 120° C. for one hour, the mixture is then allowed to cool to 70° C. and 500 parts of water are run in, the mixture is agitated for half an hour and then, at 30° C., it is neutralised to pH 5 by the slow addition of 60 parts of a 400 grams per litre caustic soda solution. A solution of 6-nitro-1,3-diethyl-benzotriazolium ethylsulphate is thus obtained which one reduces directly.

100 parts of water containing 75 parts of iron powder and 2.5 parts of acetic acid are made to boil for some moments. The solution of the benzotriazolium sulphate is introduced into this mixture in the space of half an hour whilst maintaining the temperature at 95–98° C., the temperature is then allowed to cool to about 70° C., 5 parts of decolourising charcoal are added and the mass is rendered distinctly alkaline (pH 9) by the addition of a 5 N solution of caustic soda. The sludge of iron hydroxide is filtered, washed in warm water, and 130 parts of sodium chloride, then 70 parts of zinc chloride are added to the filtrate. The 6-amino-1,3-diethyl-benzotriazolium chlorozincate crystallises out. After 2 hours stirring at ambient temperature the mixture is filtered and the precipitate washed with a mixture of 100 parts of saturated sodium chloride solution and 100 parts of a 10% zinc chloride solution, drained completely and dried at 70° C. 138 parts of a product titrating 94% are obtained.
}

A solution of 62.5 parts of this product are heated for 7 hours at 180° C. in 420 parts by volume of 10% by volume sulphuric acid. The solution obtained is treated for 5 minutes at boiling point with 5 parts of decolourising charcoal, filtered and 90 parts of sodium chloride are added. The 6-hydroxy-1,3-diethyl-benzotriazolium chlorozincate crystallises out. After standing for 2 hours the chlorozincate is filtered off and briefly washed with the same solutions of sodium chloride and zinc chloride as in the preceding stage and the precipitate is drained completely and dried at 70° C. 40 parts by weight of a product titrating 93% are thus obtained.

We claim:
1. The 6-hydroxy-1,3-dialkyl-benzotriazolium salt of the formula:

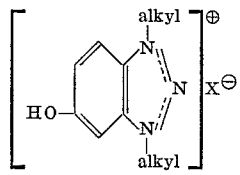

wherein the alkyl groups in positions 1 and 3 are methyl or ethyl, and $X^{\ominus}$ represents the halide, chlorozincate, methylsulfate or ethylsulfate anions.
2. 6-hydroxy-1,3-dimethyl-benzotriazolium chloride.
3. 6-hydroxy-1,3-dimethyl-benzotriazolium iodide.
4. 6-hydroxy-1,3-diethyl-benzotriazolium chlorozincate.

References Cited
FOREIGN PATENTS
1,364,560  5/1964  France _____ 260—308

OTHER REFERENCES
Fries et al., Justus Liebig's Ann. Der Chem., vol. 511, pp. 219 and 227 (1934).

ALTON D. ROLLINS, Primary Examiner

U.S. Cl. X.R.

8—41 R, 41 A, 42 R, 42 A; 260—146 R, 157, 308 B